United States Patent [19]

Coccoli

[11] Patent Number: 4,863,272

[45] Date of Patent: Sep. 5, 1989

[54] MULTI-MODE FIBER OPTIC RESONATOR GYROSCOPE

[75] Inventor: Joseph D. Coccoli, Sudbury, Mass.

[73] Assignee: The Charles Stark Draper Laboratory, Inc., Cambridge, Mass.

[21] Appl. No.: 193,364

[22] Filed: May 12, 1988

[51] Int. Cl.$^4$ .................. G01B 9/02; G01C 19/64
[52] U.S. Cl. .................................................. 356/350
[58] Field of Search ......................................... 356/350

[56] References Cited

U.S. PATENT DOCUMENTS 4,702,600 10/1987 Handrich et al. ................... 356/350

Primary Examiner—Vincent P. McGraw
Attorney, Agent, or Firm—Lahive & Cockfield

[57] ABSTRACT

A fiber optic resonant gyroscope in which the laser beam is coupled to a frequency modulator which produces three spatially separated beams frequency shifted from one another by a predetermined amount equal to the difference between the $N^{th}$ and $N^{th}+1$ traveling wire resonant modes of the fiber optic ring, a portion of the outputs from the laser frequency modulator being applied to travel in one direction around the fiber optic ring, a portion of the other two outputs being applied to travel in the opposite direction around the fiber optic ring. Detectors are employed to detect the $N^{th}$ and, $N^{th}-1$ and $N^{th}+1$ resonant modes and the signals from these detectors are fed back to the modulators to cause the respective output beams to track the respective modes. The signal values fed back are used to provide an output signal indicative of the Sagnac shift.

4 Claims, 2 Drawing Sheets

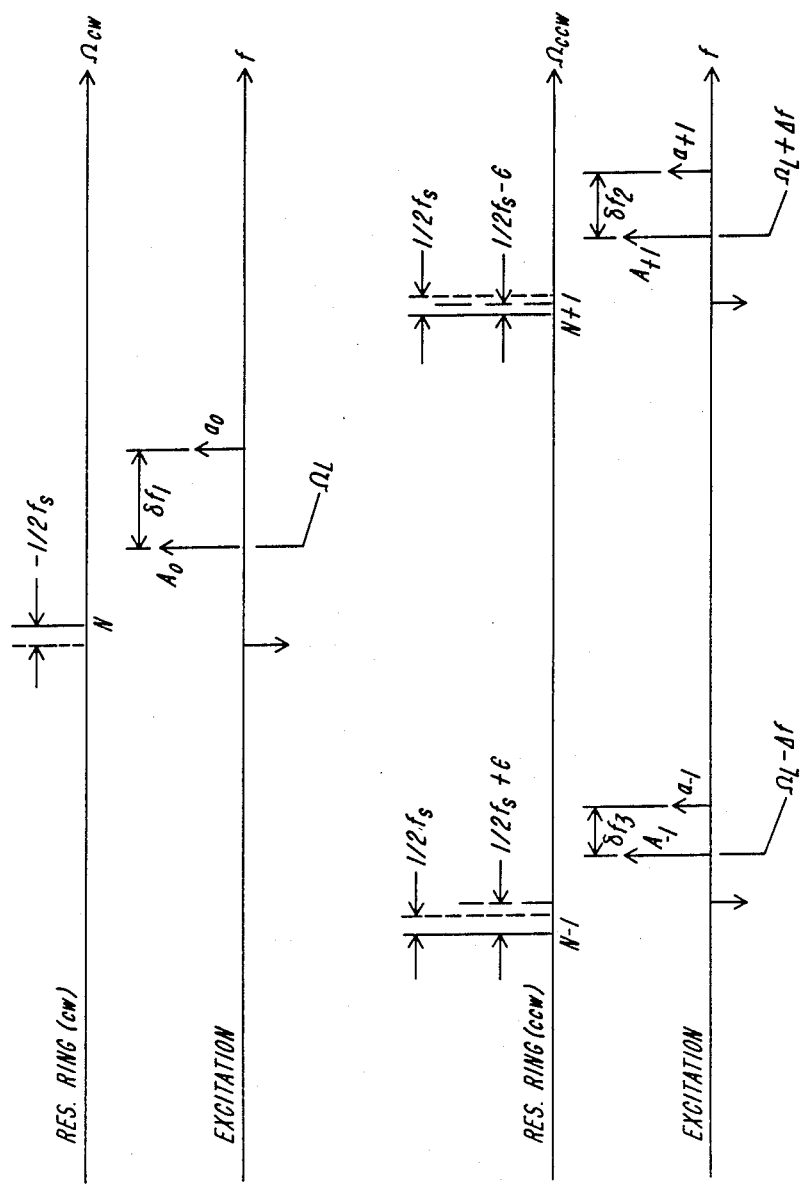

MULTI-MODE FIBER OPTIC RESONATOR GYROSCOPE

FIELD OF THE INVENTION

This invention relates in general to fiber optic gyroscopes for measuring angular rotation by means of detecting the Sagnac shift and more particularly to a passive resonance gyroscope for determining Sagnac shift while suppressing variations in signal due to ring trends.

BACKGROUND OF THE INVENTION

One general category of an optical Sagnac rotation sensor is a fiber-optic resonator gyroscope (FORG). The FORG is a high-resolution spectroscopic device employing a single laser for simultaneously determining the clockwise (cw) and counterclockwise (ccw) ring cavity resonances. A highly coherent laser is required to resolve these cavity resonances and their Sagnac shifts. The FORG requires multi-loop control circuits and the output closed-loop signal will be a beat frequency, $f_B$, where $$f_B = \frac{4A}{n\lambda L} \Omega \text{ (Hz)} \tag{1}$$

where:
$\Omega$ = the effective inertial rotation rate (including instrument bias) about the sensitive axis rad/s
A = area enclosed by the optical circuit
L = perimeter of the area enclosed by the optical circuit
$\lambda$ = wavelength of the light source
n = waveguide index of refraction.

For a circular ring of radius R, equation (1) becomes $$f_B = \frac{2R}{n\lambda} \Omega \tag{2}$$

The requirement for a coherent light source in the FORG renders it necessary to eliminate or reduce optical interference and coupling between the oppositely directed traveling wave modes of the ring cavity. Thus, the ring cavity modes should be non-degenerate so that noise spectra and coupling effects will be beyond the bandwidth of the FORG control loop. This non-degeneracy can be accomplished by selecting different longitudinal mode numbers for the cw and ccw waves, e.g., successive modes in the frequency domain. Such a frequency separation is the basis of a two mode FORG in which the cw wave is in the $N^{th}$ cavity resonance longitudinal mode and the ccw wave is in the $N'^{th}$ cavity resonance longitudinal mode, where $N \neq N'$. In such a system, however, it is necessary to be able to differentiate between environmentally induced changes in the free spectral range (i.e., mode separation in the frequency domain) and the Sagnac shift indicative of the rotation applied to the fiber optic loop.

OBJECT OF THE INVENTION

It is therefore an object of the present invention to produce a FORG which will distinguish the Sagnac shift from environmentally induced trends in the optical path length of the ring.

It is another object of this invention to provide a high-resolution FORG without moving parts and at reasonable cost.

SUMMARY OF THE INVENTION

Differentiating between environmentally induced changes in the free spectral range and the Sagnac shift can be accomplished by using three or more modes, e.g., the $N^{th}$ mode for cw wave, the $N-1^{th}$ mode for a ccw wave, the $N+1^{th}$ mode for a ccw wave, etc. The simplest multi-mode FORG that rejects environmental trends uses three resonant modes with a multiple loop control system. The system employs an optical frequency controllable, single-mode, narrow-band laser. The laser frequency can be varied in response to the application of an input control signal. The laser beam is optically coupled to a tunable multi-frequency generator that provides three spatially divergent output beams at different frequencies. The first one of the output beams is at the frequency of the input laser beam itself, a second output beam is displaced in frequency by an amount $+\Delta f$ from the frequency of the first output beam and a third output beam is displaced in frequency by $-\Delta f$ from the frequency of the first output beam. The value of the frequency shift $\Delta f$ is set approximately equal to the frequency difference between the $N^{th}$ and $N+1^{th}$ resonant modes of the fiber-optic ring.

Each of these three output beams are coupled to phase modulator means such that the first-order sidebands of the phase modulated beams are displaced in frequency far enough away from the central frequency of the beams that the central frequency lies outside the resonance bandwidths of the respective ring modes (i.e., of the $N^{th}$ and $N+1^{th}$ and $N-1^{th}$ traveling wave resonant modes in the fiber optic ring). The frequency of the beam from the phase modulator corresponding to the first output beam from the frequency generator is controlled at the laser such that the position of the first sideband is aligned in frequency with the center-frequency of the $N^{th}$ clockwise resonant mode in the fiber-optic ring. The output from this phase modulator is coupled through an optical coupler to the fiber optic ring such that it travels around the ring in a clockwise direction. The other two phase modulators introduce side bands to their respective beams which are controlled by signals applied to control inputs. These latter two output beams are coupled to the fiber optic ring to generate counterclockwise traveling waves in the ring.

A first photodetector is arranged to sense heterodyne signals of laser beams passing through the optical coupler in a first direction after they have interacted with the clockwise traveling-wave resonances in the fiber optic cavity, this first photodetector providing an output signal whose phase and amplitude are representative of the interaction between the clockwise resonant mode and the applied signal to the coupler from the first phase modulator. The output signal from this first photodetector is processed to generate an error signal which is fed to the control input of the laser and causes the sideband of the frequency of the laser to track the $N^{th}$ resonant mode in the fiber optic ring.

A second photodetector is arranged to sense heterodyne signals of laser beams passing through the coupler in the second direction after they have interacted with the counterclockwise traveling-wave resonances in the fiber optic ring. The output from this second photodetector is processed to generate phase and amplitude signals which in turn generate error signals that are coupled to the control inputs of the two variable phase modulators so that one phase modulator tracks frequency variations in the $N+1^{th}$ mode, while the other tracks frequency variations in the $N-1^{th}$ mode. Under these circumstances the values of the three phase shifts from the three phase modulators can be mathematically combined to derive the value of the Sagnac frequency shift while rejecting the effects of environmental trends.

DESCRIPTION OF THE DRAWINGS

In the drawing:

FIG. 2 is a set of frequency diagrams for the FORG illustrated in FIG. 1.

DESCRIPTION OF PREFERRED EMBODIMENTS

Figure 1:
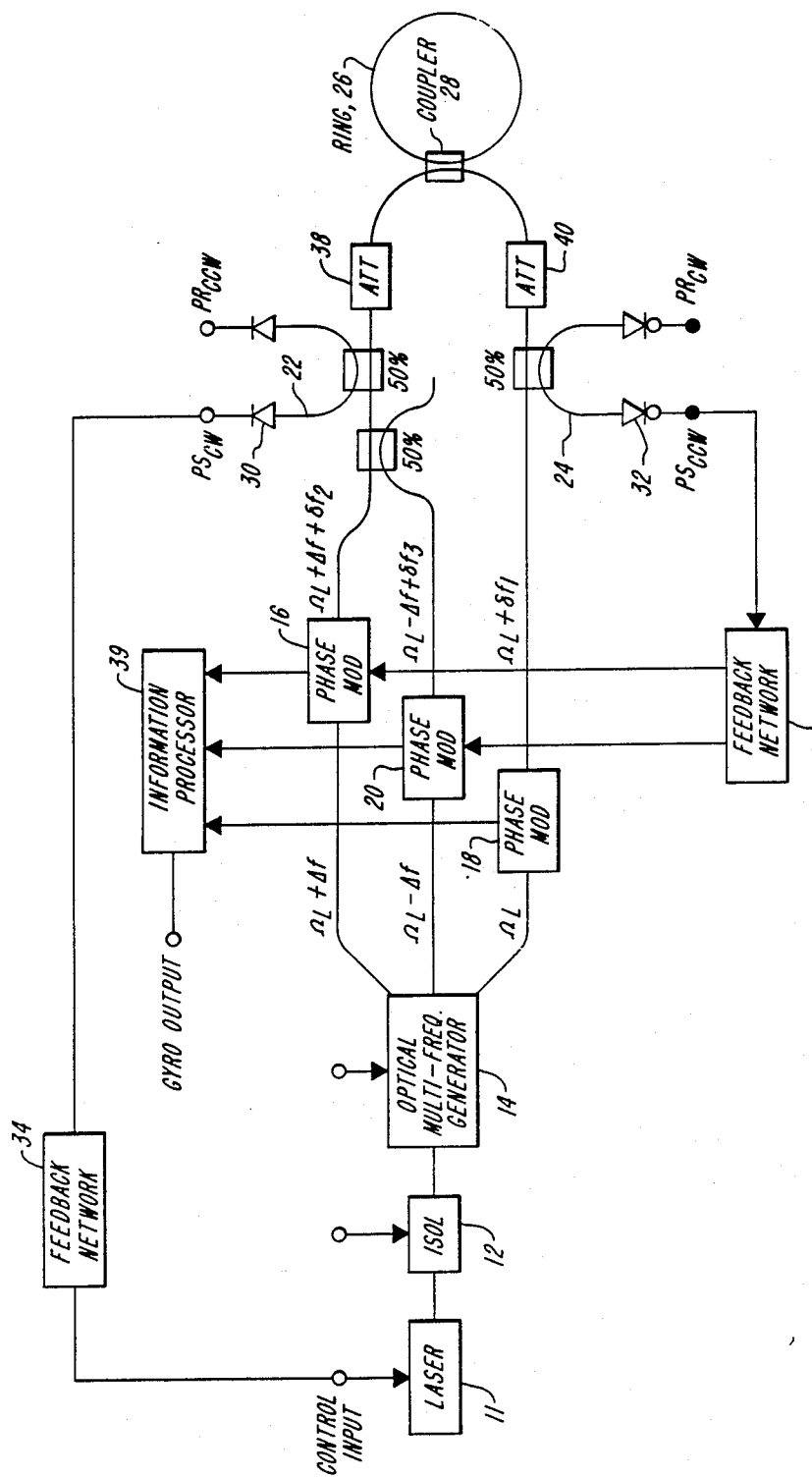
FIG. 1 is an illustration in block diagrammatic form of a FORG constructed in accordance with the principles of this invention.

With reference now to FIG. 1, a specific embodiment of a three mode FORG is illustrated. Tunable laser 11, which typically could be a tunable, single-mode solid-state laser or laser diode is optically coupled through isolator 12 to optical multi-frequency generator 14. The multi-frequency generator 14 would be an integrated-optics circuit which would provide spatially-separated outputs, the frequencies of which have been modulated by either a surface-acoustical-wave (SAW) device, a serrodyne-driven phase modulator, or any other integrated optics frequency shifter. At the generator 14 the input laser beam is spatially split into three output beams. One output beam, labeled $\Omega_L$, is at the frequency of the laser 11. The second output beam is set at a frequency displaced higher by an amount $+\Delta f$ and is labeled $\Omega_L + \Delta f$, while the third output beam is set at a frequency displaced lower by an amount $-\Delta f$ and is labeled $\Omega_L - \Delta f$.

Each of these three output beams are applied to separate phase modulators 16, 18 and 20. The first of these beams, at frequency $\Omega_L$, is optically coupled to phase modulator 18. The phase modulator 18, which is an electro-optic device of either the conventional bulk-optics form or an integrated waveguide electro optical type, converts the input beam into a carrier and sidebands whose separation is proportional to a first applied control signal. The fundamental and two first-order sideband outputs from phase modulator 18 are then at frequencies $\Omega_L$ and $\Omega_L \pm \delta f_1$. In similar fashion the beam emitted from the frequency generator at frequency $\Omega_L + \Delta f$ is optically coupled to a similar phase modulator 16, at which the output beam is converted into a fundamental and two first-order sideband outputs at frequencies $\Omega_L + \Delta f$ and $\Omega_L + \Delta f \pm \delta f_2$. The third output beam from the frequency generator, at frequency $\Omega_L - \Delta f$ is optically coupled to a third phase modulator 20, at which output beam from phase modulator 20 is converted into a fundamental and two first-order sidebands at frequencies $\Omega_L - \Delta f$ and $\Omega_L - \Delta f \pm \delta f_3$. In this embodiment phase modulator 18 introduces fixed sidebands set by a constant control signal, whereas the sidebands of phase modulators 16 and 20 are varied by variable control signals.

The output beams from the phase modulators are coupled into the fiber optic ring 26. The optical beam output from phase modulator 18 is supplied through a trimming attenuator 40 as an input to the optical directional coupler 24 and thence through directional coupler 28 where a small fraction of its power is coupled into the clockwise traveling wave of fiber optic ring 26. The uncoupled portion of the optical signal from phase modulator 18, after passing through the ring directional coupler 28, and that portion of the clockwise traveling wave which is coupled out of the ring through directional coupler 28 are transmitted through trimming attenuator 38 and through a second optical directional coupler 22 where a fraction of the power is directed to photodetector 30. Photodetector 30 exhibits the typical square law behavior characteristic and provides the mixed signal resulting from the various frequency components with their respective phases. This mixed signal is demodulated and processed in feedback network 34 to provide an error signal to apply to the control input of laser 11, tuning the optical frequency of that laser in response to the sign and magnitude of the error signal fed back to that input.

The output optical signals from phase modulators 16 and 20 are supplied together through trimming attenuator 38 as an input to the optical directional coupler 22 and thence through directional coupler 28 where a small fraction of its power is coupled into the fiber optic ring 26. Again, a fraction of this applied signal after passing through the ring coupler 28 and attenuator 40 and that portion of the counterclockwise traveling wave which is coupled out of the ring through directional coupler 28, are coupled through the optical coupler 24 to a second photosensitive detector 32. The mixed output from this photosensitive detector 32 is demodulated and otherwise processed through a feedback network to generate an error signal which is applied as control inputs to phase modulators 16 and 20. The value of each of the three side bands is provided to an information processor 39 which has an output signal indicative of the Sagnac shift experienced by the fiber optic ring 26 while rejecting environmental trends.

In the configuration shown, the frequency displacement $\Delta f$ is established to be equal to the nominal difference in frequency between the $N^{th}$ and $N-1^{th}$ or $N^{th}$ and $N+1^{th}$ traveling wave resonant modes in the fiber optic ring. Thus $$\Omega_N - \Omega_{N-1} = \Omega_{N+1} - \Omega_N = \Delta f \qquad (3)$$

where $\Omega_N = \Omega_L$,
$\Omega_{N-1} = \Omega_L - \Delta f$;
$\Omega_{N+1} = \Omega_L + \Delta f$;

As illustrated in FIG. 1 the laser is tuned by the error signal generated from processing the output of detector 30. If the controlled frequency of the laser is approximately equal to the $N^{th}$ traveling wave resonant mode circulating clockwise in the ring, then the laser frequency will be commanded to track changes in the frequency of this resonance. Similarly, the output frequency from phase modulator 16, which corresponds approximately in frequency to the $N+1^{th}$ resonant mode and the output frequency from phase modulator 20, which corresponds approximately in frequency to the $N-1^{th}$ resonant mode are applied together through couplers 22 and 28 to generate the counterclockwise optical waves circulating in the fiber optic ring 26. If these signals are commanded to track the $N+1^{th}$ and $N-1^{th}$ resonant modes in the fiber optic ring, and if both a Sagnac shift in mode resonant frequency of $f_s$ and a first order trend term in free spectral range with an instantaneous frequency shift of $\epsilon$ are present, then the frequency differences $\Delta f_{N, N-1}$ and $\Delta f_{N+1, N}$ between the modes $N$ and $N-1$ and between $N+1$ and $N$ are $$\Delta f_{N, N-1} = (-\tfrac{1}{2}f_s + \Omega_N) - (\Omega_{N-1} + \tfrac{1}{2}f_s + \epsilon) \qquad (4)$$

$$\Delta f_{N+1, N} = -(-\tfrac{1}{2}f_s + \Omega_N) + (\Omega_{N+1} + \tfrac{1}{2}f_s - \epsilon) \quad (5)$$

If the expressions (4) and (5) are added the result is equal to the trend component of the variation in the free spectral range, i.e., $$2\delta\Delta f = 2\Delta f - \Delta f_{N, N-1} - \Delta f_{N+1, N} = 2\epsilon \quad (6)$$

where $2\Delta f = \Omega_{N+1} - \Omega_{N-1}$ and $\delta\Delta f$ denotes the trend component of the change in the free spectral range.

If expression (4) is subtracted from (5) the result is proportional to the Sagnac shift, $$\Delta f_{N+1,N} - \Delta f_{N,N-1} = 2f_s \quad (7)$$

The system of FIG. 1 illustrates one specific method for tracking the resonance. As stated previously, the phase modulators 16, 18 and 20 generate a carrier frequency plus sidebands. After passing through the directional coupler, the carrier and first upper and first lower sidebands generated at the phase modulator are mixed on one of the photodetectors. When the frequency value of the carrier and its sidebands are far away from any ring resonance frequency, the beat frequency between carrier and upper sideband is equal in magnitude, but opposite in phase to the beat frequency between the lower sideband and the carrier. Therefore, there is no net beat signal generated at the photodetector. In the embodiment of FIG. 1, however, the frequency separation between carrier and sidebands is fixed such that the carrier frequency can be detuned sufficiently far from the resonance point when the resonance frequency of the clockwise traveling wave is generally aligned with one of the sidebands, for example, the lower sideband. Under this circumstance what is detected at the photodetector is the beat frequency between the upper sideband and the carrier frequency, since the lower sideband signal is reduced substantially at the resonance frequency signal dip that occurs at the output of the directional coupler of a single coupler type of resonant ring. It is this beat frequency signal and more specifically its phase which is used to control the laser center frequency $\Omega_L$ to cause the sideband to track the clockwise resonant traveling wave of the ring.

The same technique is used with respect to tracking the counterclockwise $N+1^{th}$ and $N-1^{th}$ resonance modes. However this tracking is accomplished by varying the frequency separations between carriers and sidebands introduced in phase modulators 16 and 20, respectively, by controlling the frequencies of their phase modulations in response to the error signals generated by phase discriminators.

The situation is illustrated diagrammatically in FIG. 2. In FIG. 2 the upper two diagrams indicate the relationships between the $N^{th}$ mode resonance frequency for clockwise waves in the ring and the excitation frequency for this mode. As illustrated therein for the example of clockwise inertial rotation of the ring, the Sagnac effect appears as the frequency shift $-f_s/2$ i.e., decreasing the resonance frequency. In the counterclockwise resonance the Sagnac effect produces a shift to a higher frequency by the same amount i.e., $+f_s/2$. In the clockwise mode the location of the resonance frequency, $\Omega_N$, is aligned with the excitation frequency $\Omega_L - \delta f_1 - f_s$ and therefore tracks with the input beam to the phase modulator 18. The laser frequency $\Omega_L$ is varied to track ring trends, such as caused by a thermal change in the cavity.

In the lower portion of the diagram of FIG. 2 the ring resonance locations and excitation signals for the counterclockwise waves are illustrated. However, in this diagram, the tracking of the lower sidebands with the resonance values is accomplished, as described above, by varying the value of the separation between carrier and sidebands. The counterclockwise ring resonances include a frequency shift of one-half the value of the Sagnac shift, $(f_s/2)$ toward the upper frequency end in both the $N-1^{th}$ and $N+1^{th}$ modes. However, the ring thermal trend shifts the frequency by an amount $\epsilon$ in one direction for the $N+1^{th}$ mode and in the opposite direction for the $N-1^{th}$ mode with respect to the $N^{th}$ mode.

These counterclockwise signals are mixed on photodetector 32, and demodulated to DC within the feedback network 36. The counterclockwise signal from photodetector 32 is:

$$I_{ccw} = A^2_{ccw} + 2a_{+1}A_{+1}\cos(\delta f_2 \cdot t) + 2a_{-1}A_{-1}\cos(\delta f_3 \cdot t), \quad (8)$$

where $A_{ccw}$ is the magnitude of the DC component of the signal $A_{+1}$ is the magnitude of the component at the carrier frequency of the $N+1$ mode and $a_{+1}$ is the magnitude of the component at the sideband frequency of the $N+1$ mode; and where $A_{-1}$ is the magnitude of the component at the carrier frequency of the $N-1$ mode and $a_{-1}$ is the magnitude of the component at the sideband frequency of the $N-1$ mode.

Similarly the filtered clockwise signal is:

$$I_{cw} = A^2_{cw} + 2a_0 A_0 \cos(\delta f_1 t) \quad (9)$$

where $A_{cw}$ is the magnitude of the DC component of the clockwise signal, $A_0$ is the magnitude of the component at the carrier frequency of the N mode, and $a_0$ is the magnitude of the component at the sideband frequency of the $N^{th}$ mode.

The values of the frequency shifts $\delta f_2$, $\delta f_1$, and $\delta f_3$ can be precisely known because they are generated with precision frequency synthesizers at accuracies that exceed one part in $10^{11}$. Values of these signals are supplied to information processor 38. Since the relationships between $\delta f_1$, $\delta f_2$ and $\delta f_3$ are:

$$\delta f_1 - \delta f_3 = f_s + \epsilon \quad (10)$$

$$\delta f_1 - \delta f_2 = f_s - \epsilon \quad (11)$$

then the value of the Sagnac shift can be determined by addition of (10) and (11), i.e., $$f_s = \delta f_1 - \tfrac{1}{2}(\delta f_2 + \delta f_3) \quad (12)$$

While a specific preferred embodiment has been shown, the invention may be realized with other components and subsystems.

We claim:

1. A fiber optic ring resonator gyroscope comprising, a laser emitting an output beam at a controllable frequency $\Omega_L$ which can be controlled to any given value within a predetermined range of frequency in response to an applied signal at its control input; an optical multi-frequency generator positioned to receive said output laser beam and provide spatially separated first, second and third optical output beams at frequencies $\Omega_L$, $\Omega_L + \Delta f$ and $\Omega_L - \Delta f$, respectively, where $\Omega_L$ is the output frequency of said first output beam and $\Delta f$ is a predetermined frequency shift for the spatially separated second and third output beams;

a fiber optic ring;

phase modulators for generating sidebands of the first, second and third optical output beams such that $\Omega_L$ becomes $\Omega_L \pm \delta f_1$, $\Omega_L + \Delta f$ becomes $\Omega_L + \Delta f \pm \delta f_2$ and $\Omega_L - \Delta f$ becomes $\Omega_L - \Delta f \pm \delta f_3$;

an optical directional coupler means for coupling the optical output from said phase modulators to said fiber optic ring such that the first output beam from said first phase modulator means provides an optic wave traveling around said ring in a first direction, the second and third optical output beams from said second and third phase modulators means being coupled through said optical coupler means to said fiber optic ring to provide two waves of different optical frequencies traveling in the opposite direction to the said first beam around said ring, wherein said frequency shift $\Delta f$ is approximately equal to the difference between the $N^{th}$ and $N+1^{th}$ traveling wave resonant modes of said fiber optic ring, first detection means for detecting the fiber optic ring $N^{th}$ mode traveling wave resonant frequency and first feedback means coupling said first detection means to said laser control input to vary the output frequency of said laser to track said $N^{th}$ resonant mode, second and third detection means for determining the fiber optic ring $N+1^{th}$ and $N-1^{th}$ mode traveling wave resonant frequencies, respectively, and second feedback means coupling said second and third detection means to said optical second and third phase modulators to cause said second optical output beam to track said $N+1^{th}$ resonant mode, and said third optical output beam to track said $N-1^{th}$ resonant mode; and means for receiving the values of variations in frequency of said second and third optical output beams on a continuing basis which when combined with the fixed frequency of the fixed optical output beam provides an output signal indicative of the Sagnac shift produced by rotation of said fiber optic ring while suppressing the effects of environmentally induced trends or drift in the resonance characteristics of said ring.

2. A fiber optic resonant optical ring gyroscope comprising, a laser emitting an output beam at a controllable frequency $\Omega_L$ which can be controlled to any given value within a predetermined range of frequency in response to an applied center frequency control signal;

an optical frequency modulator positioned to receive said output laser beam and provide three spatially separable optical output beams at frequencies $\Omega_L$, $\Omega_L - \Delta f$ and $\Omega_L - \Delta f$ respectively, where $\Omega_L$ is the output frequency of one of said output beams and $\Delta f$ is a predetermined frequency shift for the other two spatially separated beams;

phase modulator means positioned to intercept said three spatially separated output beams from said frequency modulator and produce three phase modulated output beams, said phase modulator means including control inputs to vary the phase modulations of at least two of said output beams, a fiber optic ring;

an optical directional coupler means for coupling the optical output from said phase modulator means to said fiber optic ring such that the first output beam from said phase modulator means provides an optic wave traveling around said ring in a first direction, the second and third optical output beams from said phase modulator means being coupled through said optical coupler means to said fiber optic ring to provide two waves of different optical frequencies traveling in the opposite direction to said first beam around said ring, a first photodetector connected to said optical coupler means for independently detecting the resultant signal on said coupler means from the interaction between said first phase modulator means output beam provided to said coupler means and the traveling wave resonance of the optical wave traveling in said first direction around said fiber optic ring, and second and third photodetectors detecting the output from said coupler means resulting from the interaction between said second and third output beams provided to said coupler means from said phase modulator means and the traveling wave resonances from the optical wave traveling in the opposite direction around said fiber optic ring, wherein said frequency shift $\Delta f$ is approximately equal to the difference between the $N^{th}$ and $N+1^{th}$ traveling wave resonance modes of said fiber optic ring, said phase modulator means providing said first output beam with sidebands displaced a predetermined frequency, $\delta f_1$ away from the center frequency of said first output beam, said second and third phase modulator output beams being arranged to have sidebands displaced by amounts $\delta f_2$ and $\delta f_3$ controlled by first and second control inputs respectively, first feedback means coupled between said first photodetector and said controllable laser to maintain the frequency $\Omega_L$ at a value such that it is displaced from the $N^{th}$ traveling wave resonance mode frequency of said fiber optic ring by an amount which aligns it with one sideband from said phase modulator first output beam, and second feedback means connected between said second and third photodetectors and the first and second control inputs of said phase modulator means respectively to maintain the value of the displacement between the center frequency and the sideband frequency of each of said modulator means second and third output beams at values such that the same phase sidebands correspond in frequency with the $N+1^{th}$ mode resonance frequency and the $N-1^{th}$ mode resonance frequency respectively, in said fiber optic ring, and means receiving the values of the sideband displacements, $\delta f_1$, $\delta f_2$ and $\delta f_3$ from said phase modulator means on a continuing basis to provide an output signal indicative of the Sagnac shift produced by rotation of said fiber optic ring, while suppressing the effects of environmentally induced trends or drift in the resonance characteristics of said ring.

3. A fiber optic resonance gyroscope comprising, a laser emitting an output beam at a controllable frequency $\Omega_L$ which can be controllable to any given value in a predetermined range of frequency in response to an applied input control signal, a fiber optic ring, a first optical directional coupler for coupling optical signals to said fiber optic ring, first and second photodetectors optically coupled to said fiber optic ring, said first photodetector detecting optical signals passed through said coupler in a first direction, said second photodetector detecting optical signals passed through said coupler in the opposite direction, modulator means having input control means, said modulator means being coupled to said laser beam output and providing to said coupler means a first optical signal having a center frequency $\Omega_L$ which varies in direct relation to variations in frequency of said laser output beam, and having upper and lower sidebands frequency displaced a predetermined amount from $\Omega_L$, said first signal being coupled to travel through said coupler in a first direction providing an optical wave traveling around said fiber optic ring in one direction, first feedback means connecting the output from said first detector as a control input to said laser to maintain the center frequency $\Omega_L$ of said first optical signal from said modulator at a value such that one of said sidebands is aligned in frequency with the $N^{th}$ traveling wave resonant mode of said fiber optic ring, said modulator means providing second and third output optical signals each having a center frequency and upper and lower sidebands, the center frequencies of said second and third output optical signals being displaced from the center frequency of said first modulator output by an amount equal to the difference in frequency between the $N^{th}$ and $N^{th}+1$ and $N^{th}$ and $N^{th}-1$ traveling wave resonant modes respectively of said fiber optic ring, a second optical directional coupler for coupling said second and third modulator optical output signals to said fiber optic ring to travel around said fiber optic ring in a direction opposite to said one direction, second feedback means connecting the output from said second detector as a control input to said modulator means for controlling the frequency displacement between said center frequency and said sidebands of said second and third modulator means output signals to maintain one of said sidebands of said second modulator means output signal at a frequency in alignment with the $N+1^{th}$ fiber optic resonant mode and to maintain said one sideband of said third modulator output signal at a frequency in alignment with the $N-1^{th}$ fiber optic resonant mode, and means for receiving all of said feedback signals and generating an output value indicative of the Sagnac shift in said fiber optic ring.

4. A fiber optic ring resonator gyroscope in accordance with claim 2, wherein said means for providing an output signal includes, an information processor which provides an output signal $f_s$ proportional to the Sagnac shift by performing the operation, $$f_s = \delta f_2 - \tfrac{1}{2}(\delta f_1 + \delta f_3).$$

* * * * *

UNITED STATES PATENT AND TRADEMARK OFFICE
CERTIFICATE OF CORRECTION

PATENT NO. : 4,863,272            Page 1 of 2

DATED : September 5, 1989

INVENTOR(S) : Joseph D. Coccoli et al.

It is certified that error appears in the above-identified patent and that said Letters Patent is hereby corrected as shown below:

ON TITLE PAGE: Item [75]

Please correct the listing of the inventors to read as follows:

1. Joseph David Coccoli, Sudbury, MA
2. Godfrey T. Coate, Belmont, MA
3. Donato Cardarelli, Medfield, MA Column 1, line 53, "and the ccw ave is" should be --and the ccw wave is--.

UNITED STATES PATENT AND TRADEMARK OFFICE
CERTIFICATE OF CORRECTION

Page 2 of 2

PATENT NO. : 4,863,272
DATED : September 5, 1989
INVENTOR(S) : Joseph D. Coccoli et al.

It is certified that error appears in the above-identified patent and that said Letters Patent is hereby corrected as shown below:

Column 6, line 24,

"is the magnitude of the DC component of the signal A+1"

should be

--is the magnitude of the DC component of the signal, A+1--.

Signed and Sealed this

Eighteenth Day of August, 1992

Attest:

DOUGLAS B. COMER

Attesting Officer     Acting Commissioner of Patents and Trademarks